United States Patent
Takeshita (10) Patent No.: US 8,922,697 B2
(45) Date of Patent: Dec. 30, 2014

(54) DIGITAL CAMERA AND FINDER DEVICE THEREOF

(71) Applicant: FUJIFILM Corporation, Tokyo (JP)

(72) Inventor: Yukitaka Takeshita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 106 days.

(21) Appl. No.: 13/837,540

(22) Filed: Mar. 15, 2013

(65) Prior Publication Data

US 2013/0201379 A1    Aug. 8, 2013

Related U.S. Application Data

(63) Continuation of application No. PCT/JP2011/060757, filed on May 10, 2011.

(30) Foreign Application Priority Data

Sep. 17, 2010 (JP) ................. 2010-210227

(51) Int. Cl.
| | |
|---|---|
| H04N 5/222 | (2006.01) |
| H04N 5/232 | (2006.01) |
| G03B 13/02 | (2006.01) |
| G03B 17/20 | (2006.01) |
| G02B 27/14 | (2006.01) |
| G03B 17/02 | (2006.01) |

(52) U.S. Cl.
CPC ............ *H04N 5/23293* (2013.01); *G03B 13/02* (2013.01); *G03B 17/20* (2013.01); *G02B 27/141* (2013.01); *G03B 17/02* (2013.01)
USPC ...................... 348/333.09; 348/341

(58) Field of Classification Search
CPC ................................ H04N 5/23293
USPC ................. 348/333.02, 333.09, 341
See application file for complete search history.

(56) References Cited

U.S. PATENT DOCUMENTS

| | | | |
|---|---|---|---|
| 5,161,025 A | 11/1992 | Nakao | |
| 2001/0052947 A1 | 12/2001 | Taniai et al. | |
| 2006/0170806 A1 | 8/2006 | Saiki et al. | |

FOREIGN PATENT DOCUMENTS

| | | |
|---|---|---|
| JP | 3-292067 | 12/1991 |
| JP | 5-145807 | 6/1993 |
| JP | 2001-346219 A | 12/2001 |
| JP | 2002-196260 A | 7/2002 |
| JP | 2006-197435 A | 7/2006 |

OTHER PUBLICATIONS

PCT/ISA/237 (written opinion of the international searching authority) dated Jun. 14, 2011.

*Primary Examiner* — Gevell Selby
(74) *Attorney, Agent, or Firm* — McGinn IP Law Group, PLLC (57) ABSTRACT

Provided are a polarization beam splitter 69 disposed between a subject side finder window 16 and a photographer side observation window 17 and disposed to be obliquely inclined at 45 degrees with respect to an optical axis L of an incident light from the subject side finder window 16, a polarizing filter installed at the incident light entering side of the polarization beam splitter 69 and configured to reflect or cut the s-polarized wave of the incident light; and a display device 61 configured to project a display information of the s-polarized wave on the polarization beam splitter 69 and project the display information reflected from the polarization beam splitter 69 in a direction of the photographer side observation window 17.

10 Claims, 9 Drawing Sheets

DIGITAL CAMERA AND FINDER DEVICE THEREOF

TECHNICAL FIELD

The present invention relates to a hybrid finder device provided with both an optical viewfinder and an electronic viewfinder, and a digital camera equipped with the hybrid finder device.

BACKGROUND ART

Conventionally, an optical viewfinder (hereinafter, also referred to as an OVF) is installed also in a digital camera which includes a solid state imaging device and processes a captured image data digitally to be stored in a recording medium within the camera. The digital camera is configured such that a photographer sees, for example, a composition of a subject with eyes and presses a shutter button while seeing through a finder.

However, it is generalized in a recent digital camera that a through image (a live view image) output from a solid state imaging device is displayed on a large scale liquid crystal display device installed in the rear side of the digital camera without installing an optical viewfinder to play a finder role.

However, in a type of digital camera in which the through image is displayed on the large scale liquid crystal display device in the rear side of the digital camera, it is necessary to keep the camera away from the face of a user in order to identify the through image. Thus, there is a problem that shaking of the hands occurs when pressing the shutter button. Further, since the through image output from the solid state imaging device and subjected to an image processing is displayed, there is also a problem to be solved in that a little time lag exists as compared to an actual subject state.

In contrast, there is a digital camera equipped with an electronic viewfinder (hereinafter, also referred to as an EVF) instead of an optical view finder. The electronic viewfinder is equipped with a small liquid crystal display device within an observation window of a small finder to display a through image output from a solid state imaging device in the small liquid crystal display device so as to allow a photographer to identify a composition of a subject and the like.

However, since the electronic viewfinder has a small number of pixels of the small scale liquid crystal display device displaying the through image, only a coarse image may be displayed. Therefore, there is a problem to be solved in that a photographer cannot identify a minute part of the subject. Furthermore, as similar to the above-description, since the through image output from the solid state imaging device and subjected to an image processing is displayed, there is also a problem to be solved in that a little time lag exists as compared to an actual subject state.

In a recent digital camera, in addition to the above-described problems and problem to be solved, there are also many voices calling for revival of an optical viewfinder in some of the camera fans. For this reason, equipping of a hybrid finder device that includes both the optical viewfinder and the electronic viewfinder to the digital camera, for example, as described in Patent Literature 1, is under consideration.

The hybrid finder device is configured such that a half mirror is disposed to be inclined at an angle of 45 degrees in the way of an optical path of the optical viewfinder and light of images displayed on screen of a small scale liquid crystal display device for an EVF is projected to the half mirror. The hybrid finder device either selects any one of an optical image of a subject having passed through the optical viewfinder and an image displayed on the screen of the small scale liquid crystal display device for the EVF to be projected onto the eyes of a photographer through an ocular lens or mixes both the optical image and the image to be projected on the eyes of the photographer.

CITATION LIST

Patent Literature

Patent Literature 1 JP-A-3-292067

SUMMARY OF INVENTION

Technical Problem

In a case of a viewfinder device of Patent Literature 1 where an optical image of a subject having passed through an optical viewfinder and a displayed image of an electronic viewfinder are projected onto an eye of a photographer, since the images are passed through a prism having a half mirror, it may become difficult to view the optical image of the OVF and the image of the EVF. Such a case will be described with reference to FIGS. 9A and 9B.

Figure 9A:
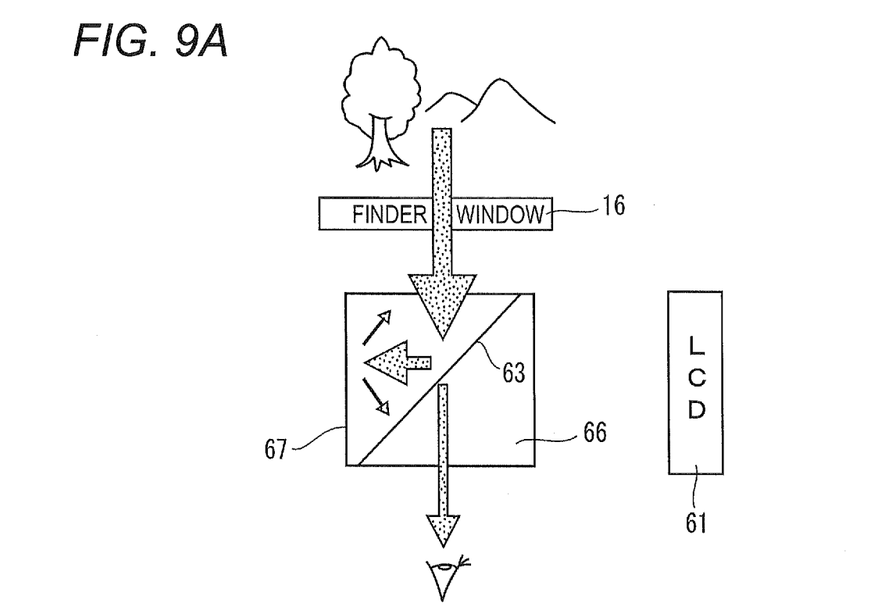
FIGS. 9A and 9B are views for describing problems of a conventional hybrid finder device.

FIG. 9A is an explanatory view of principle of a case where an optical view passed through an optical viewfinder of a hybrid finder device is projected onto an eye of a photographer. Incident light from a subject is incident on a prism 66 through a finder window 16. The prism 66 is constructed by bonding two triangular prisms, and a half mirror 63 made by, for example, silver film is formed on a bonding surface of the prism 66 to be inclined obliquely at 45 degrees with respect to the incident light.

An OVF optical image of from the subject that has transmitted through the finder window 16, travelled straight and transmitted through the half mirror 63 is exited from the prism 66, and reaches an eye of the photographer. Meanwhile, about 50% of light are reflected from the half mirror 63, and the reflected light travels in a direction perpendicular to the incident light and reaches an end surface 67 of the prism 66.

The end surface 67 is coated with, for example, carbon and adapted to absorb the reflected light. However, not all the reflected light can be absorbed and a part of the reflected light is reflected off the end surface 67. This light becomes stray light to be reflected multiple times and enters an eye of the photographer. This light becomes harmful light which blurs the image which goes straight from a subject and enters the eye of the photographer.

Figure 9B:
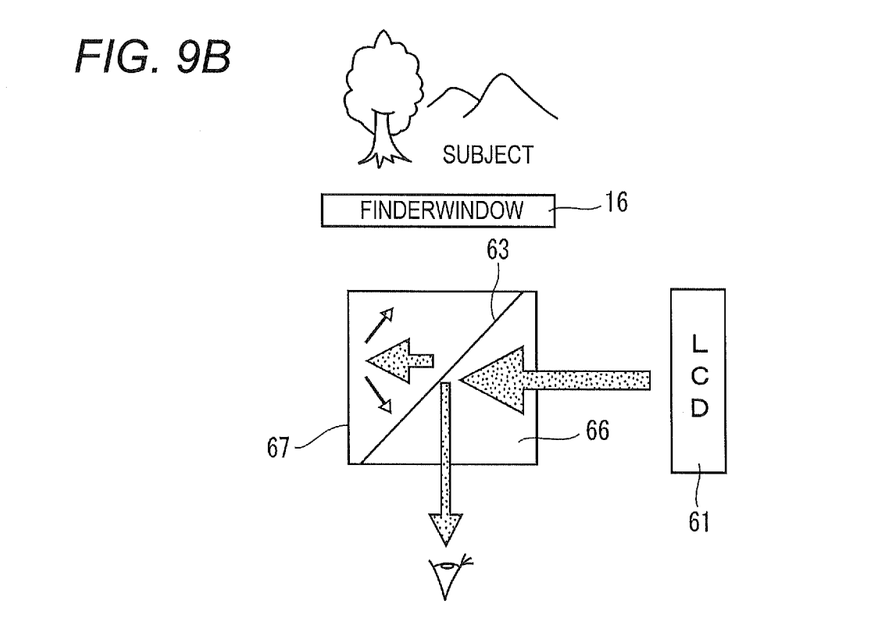

FIG. 9B is an explanatory view of principle of a case where an EVF view having passed through an electronic viewfinder of the hybrid finder device is projected onto the eye of the photographer. The incident light from the subject is shielded by turning a state of a shutter not illustrated into "closed". The EVF image including such as a photographed image or photographing condition information is displayed on a display device 61 for the EVF disposed in parallel to the prism 66. Light of the EVF image is incident on the prism 66 and reflect off the half mirror 63 at an angle of 90 degrees. The reflected light enters the eye of the photographer to allow the photographer to view the displayed image on the display device 61 for the EVF.

About 50% of light exited from the display device 61 for EVF transmit the half mirror 63, go straight and reach the end surface 67 of the prism 66. The carbon coated end surface 67 absorbs the transmitted light, but not all the transmitted light are absorbed, and a part of the reflected light is reflected off the end surface 67. The reflected light becomes stray light to be reflected multiple times and enters the eye of the photographer. This light becomes harmful light which blurs the image which goes straight from a subject and enters the eye of the photographer from the display device 61 for the EVF.

Since the conventional finder device had a difficulty in removing the harmful light, it was difficult to provide a clear OVF optical image and an EVF image to a photographer.

An object of the present invention is to provide a digital camera that suppresses the harmful light and turns the OVF optical image or EVF image projected onto the eye of the photographer through a hybrid finder device into an easily viewable image, and a finder device of the digital camera.

Solution to Problem

A finder device of the present invention, includes: a polarization beam splitter disposed between a subject side finder window and a photographer side finder observation window, and disposed to be obliquely inclined at 45 degrees with respect to an optical axis of an incident light entering from the subject side finder window; a polarizing filter installed at an incident light entering side of the polarization beam splitter and configured to reflect or cut s-polarized wave of the incident light; and a display device configured to project a display information of the s-polarized wave on the polarization beam splitter and project the display information reflected from the polarization beam splitter in a direction of the photographer side finder observation window.

An imaging apparatus of the present invention is equipped with a solid state imaging device capturing image of a subject and the finder device discussed above.

Advantageous Effects of Invention

The present invention is configured such that a polarization beam splitter which reflects almost 100% of s-polarized waves and transmits almost 100% of p-polarized waves is used to function an optical viewfinder by the p-polarized wave and to function an electronic viewfinder by the s-polarized wave without using a half mirror which transmits 50% of light and reflects the other 50% of light. Therefore, the stray light is reduced and the OVF optical image and EVF image are not disturbed by harmful light.

BRIEF DESCRIPTION OF DRAWINGS

FIG. 4 is a view illustrating an example in which FIGS. 3A and 3B are overlaid and displayed.

DESCRIPTION OF EMBODIMENTS

Hereinafter, an embodiment of the present invention will be described with reference to the accompanying drawings.

Figure 1:
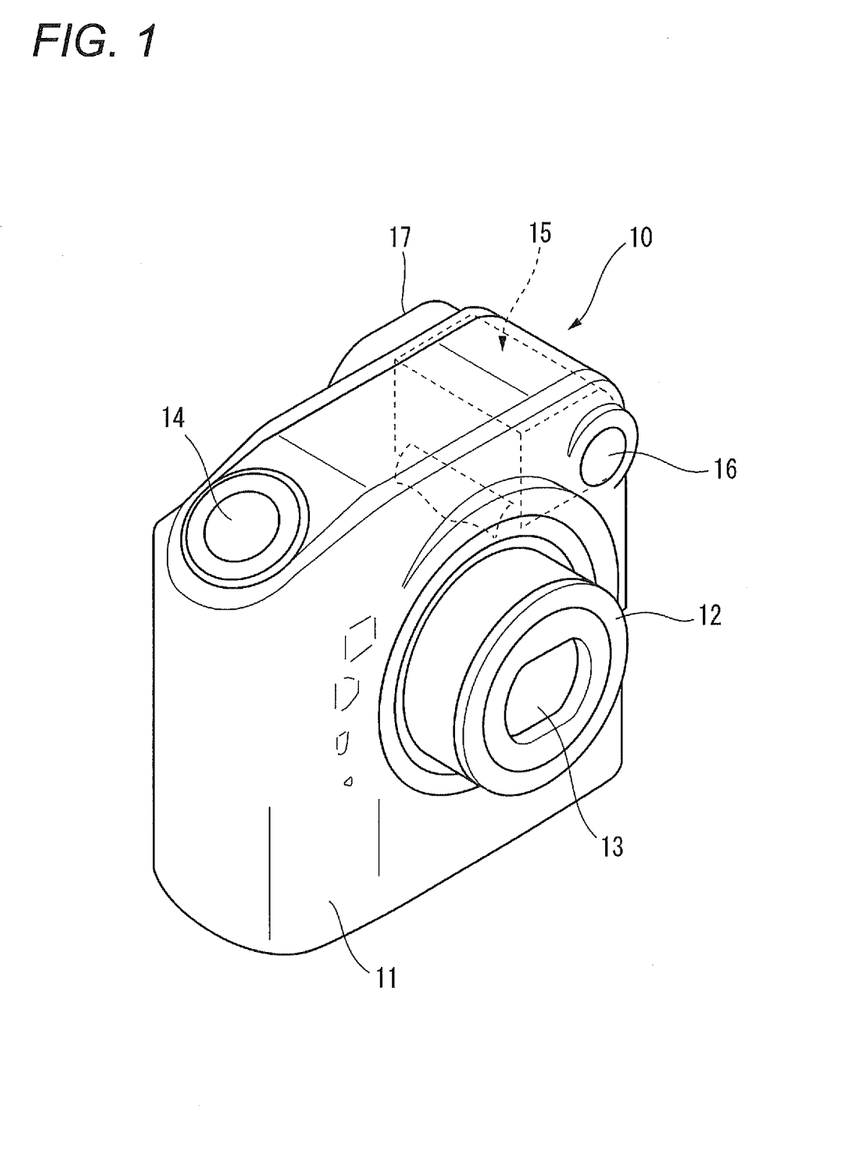
FIG. 1 is a perspective view of an external appearance of a digital camera according to an embodiment of the present invention.

FIG. 1 is a perspective view of an external appearance of a compact type digital camera according to an embodiment of the present invention. A digital still camera 10 which is an imaging apparatus of the present embodiment is provided with a rectangular case 11, and a retractable lens holder assembly 12 is installed at the center of the front surface, and a photographing lens (a focusing lens or zoom lens) 13 is accommodated within the lens holder assembly 12.

A shutter release button 14 is installed at one side of the top surface of the case 11 and a hybrid-type finder device 15 to be described below in detail is installed at a corner portion located within the case 11 and opposite to the shutter release button 14. A subject side finder window 16 of the finder device 15 is installed at a corner portion of the front surface and a photographer side finder observation window 17 of the finder device 15 is installed at the rear side thereof.

Reference numeral 74 of FIG. 1 denotes a flexible printed substrate (FPC) and the FPC 74 (see FIG. 5) connected to the finder device 15 is connected to a video encoder 41 to be described below in detail.

Figure 2:
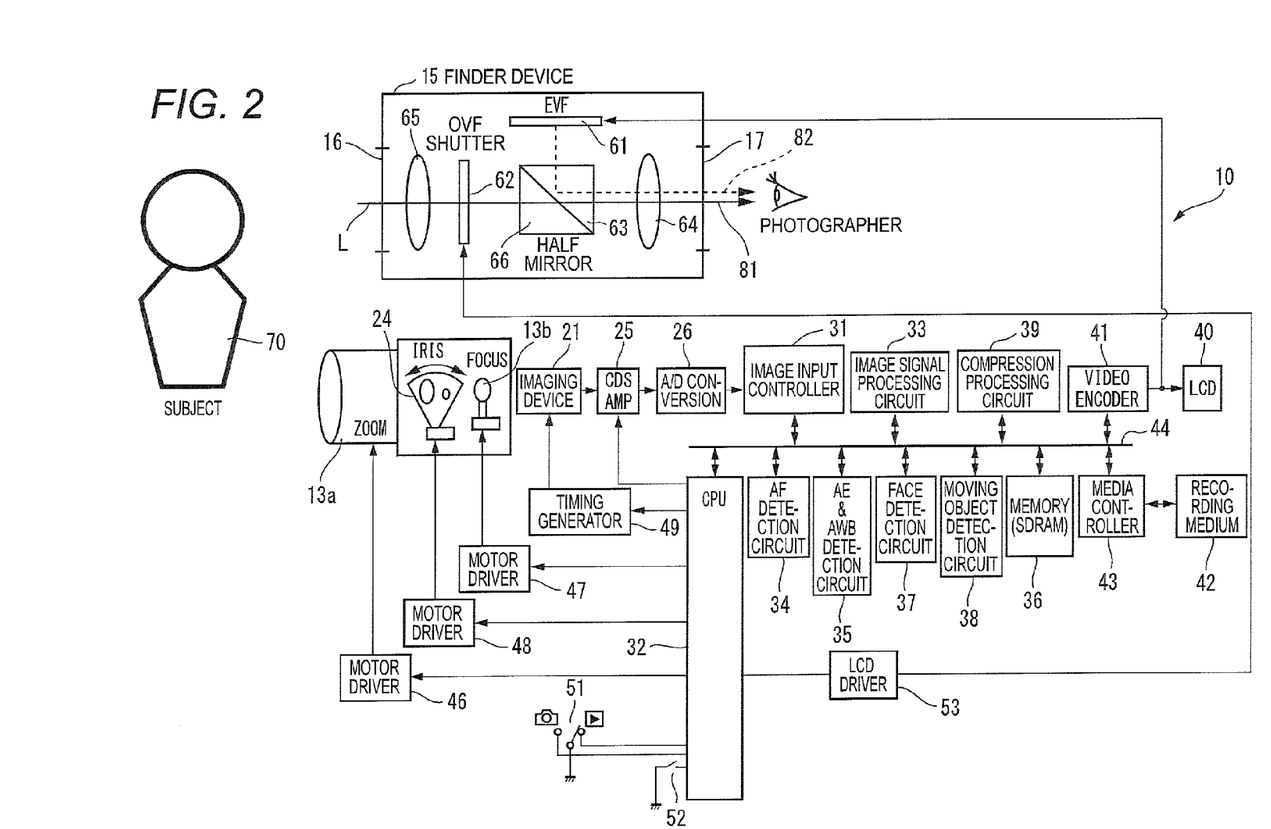
FIG. 2 is a view illustrating an internal configuration of the digital camera illustrated in FIG. 1.

FIG. 2 is an internal configuration block diagram of the digital camera 10 illustrated in FIG. 1. The digital camera 10 includes a solid state imaging device 21, a photographing lens 13, an aperture (iris) 24, a CDSAMP 25, and an analog-to-digital (A/D) converter 26. The solid state imaging device 21 is a single plate-type solid state color imaging device. In the meantime, the solid state imaging device 21 is a CCD type solid state imaging device in this example, but may also be another type of solid state imaging device, such as a CMOS type solid state imaging device. The photographing lens 13 is disposed at the front end of the solid state imaging device 21 and includes a zoom lens 13a and a focusing lens 13b. The aperture (iris) 24 controls an amount of light entering the solid state imaging device. The CDSAMP 25 performs an analog signal processing for an output signal (a captured image signal) of the solid state imaging device 21, and includes a correlation double sampler (CDS) and a gain control amplifier (AMP). The A/D converter 26 converts the output signal of the CDSAMP 25 into a digital signal.

The digital camera 10 also includes an image input controller 31, a central processing unit (CPU) 32, an image signal processing circuit 33, an AF detection circuit 34, an AE&AWB detection circuit 35, an SDRAM 36, a face detection circuit 37, a moving object detection circuit 38, a compression processing circuit 39, a liquid crystal display device 40, a video encoder 41, a media controller 43, and a bus 44 connecting these components. The image input controller 31 receives a captured image signal composed of the digital signal output from the A/D converter 26. The CPU 32 comprehensively manages and controls the entirety of the digital camera 10. The image signal processing circuit 33 performs an image processing for the captured image signal. The AF detection circuit 34 detects a focus point from the image data output from the solid state imaging device 21. The AE&AWB detection circuit 35 automatically detects an exposure amount and a white balance. The SDRAM 36 serves as a storage unit used as a work memory. The face detection circuit 37 detects a "face" image of the subject. The moving object detection circuit 38 detects an image of a moving object in the subject. The compression processing circuit 39 compresses the captured image data after being subjected to the image processing into a JPEG image or MPEG image. The video encoder 41 displays a captured image or through image, and various information to be described below on the liquid crystal display device 40 installed, such as on the rear side of the camera or an liquid crystal display device (EVF) 61 within the finder device 15. The media controller 43 stores the captured image data in a recording media 42.

The digital camera 10 includes a motor driver 46, a motor driver 47, a motor driver 48, and a timing generator 49. The motor driver 46 supplies a driving motor of the zoom lens 13a with a driving pulse. The motor driver 47 supplies a driving pulse to a motor that drives a position of the focusing lens 13b. The motor driver 48 supplies a driving pulse to a motor that drives a position of the iris 24. The timing generator 49 supplies the motor driver 48 and the solid state imaging device 21 with driving timing pulses (an electronic shutter pulse, read-out pulse and transfer pulse). The motor driver 46, the motor driver 47, the motor driver 48, and the timing generator 49 are operated based on a command issued from the CPU 32. Further, the CDSAMP 25 is also operated based on a command issued from the CPU 32.

Also connected to the CPU 32 are a switch 51 that switches a photographing mode and a playback mode, and a shutter release button 52 of a two-step shutter. The CPU 32 controls the digital camera 100 based on a user command input from the switches 51 and 52. Further, the digital camera 100 of the present embodiment includes a motor driver 53 operated based on the command issued from the CPU 32, in which the motor driver 53 opens and closes the OVF shutter (in this example, a mechanical shutter) 62, which will be described below, within the finder device 15.

The finder device 15 accommodates, for example, a single focus objective lens 65, an OVF shutter 62, a prism 66 having a polarization beam splitter 69 included therein, and an ocular lens 64 in this order sequentially between the subject side finder window 16 and the photographer side observation window 17.

The polarization beam splitter 69 is a multilayered dielectric film formed on a quadrangle bonding face where two triangular prisms are bonded. The polarization beam splitter 69 is installed such that a surface of a light incident side is obliquely inclined at 45 degrees with respect to an incident optical axis L from a subject. The liquid crystal display device 61 as described above is installed such that the liquid crystal display device 61 is positioned adjacent to the prism 66 having the polarization beam splitter 69 therein, and the display surface of the liquid crystal display device 61 is positioned to be parallel to the incident optical axis L. By doing this, an incident light from the subject transmitted through the polarization beam splitter 69 and a light generated from the liquid crystal display device 61 and reflected from the polarization beam splitter 69 are projected onto an eye of the photographer while being in an overlap state.

The liquid crystal display device 61 for the EVF is provided with a switching switch, which is not illustrated, such that the same information as that of the large liquid crystal display device 40 installed on the rear side of the camera is displayed exclusively on only one of the apparatus 61 and the apparatus 40, and the switching switch is switched by the photographer. The information displayed on the crystal display device 61 for EVF is a through image information output from the solid state imaging device 21 or an image information after photographing, but the information, such as a photographing condition may also be displayed.

The finder device 15 is used as the optical view finder (OVF) by setting the OVF shutter 62 to be in "open" state and setting the crystal display device 61 for the EVF to be in "non-display" mode. The finder device 15 is used as the electronic view finder (EVF) by setting the OVF shutter 62 to be in "closed" state and displaying the through image information and the photographing condition information on the display device 61 for the EVF.

Further, when the crystal display device 61 for the EVF is set to display information such as the photographing condition information and the OVF shutter 62 is set to be in "open" state, it is possible to identify the photographing condition information in the same finder frame simultaneously while identifying the composition of subject with the optical viewfinder.

Figure 3A:
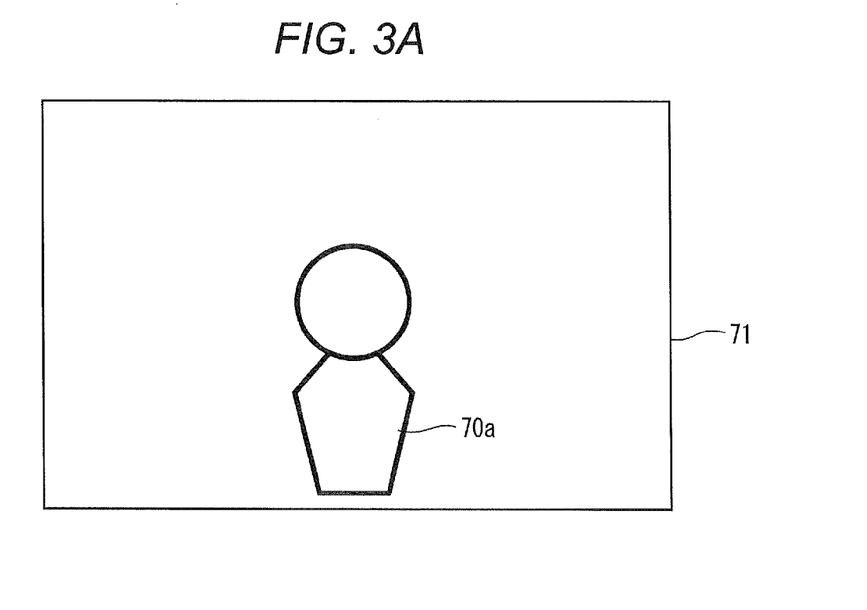
FIG. 3A is a view illustrating an example of an optical image having passed through an optical viewfinder and FIG. 3B is a view illustrating an example of information by an EVF displayed by being overlaid on the optical image.

FIG. 3A illustrates an example of an optical image that has entered the subject side finder window 16 of the finder device 15, transmitted the polarization beam splitter 69, transmitted the photographer side observation window 17 and projected onto an eye of the photographer. FIG. 3A illustrates a state in which an optical image 70a of the subject 70 illustrated in FIG. 2 is projected at the center of a finder frame 71.

Figure 3B:
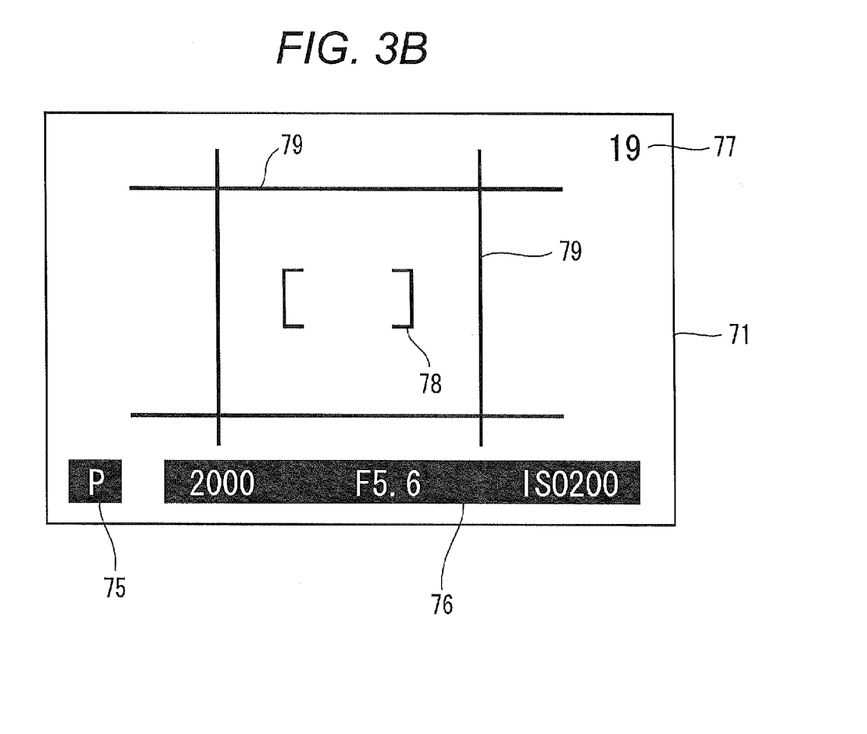

FIG. 3B illustrates an example of a piece of information, such as the photographing condition, displayed on the display device 61 for the EVF. The "P" that indicates photographing mode information (in this example, indicates a program photographing mode), and the photographing condition information (shutter speed of 1/2000 second, iris F=5.6, ISO sensitivity of 200) 76 are displayed at the lower side of the screen (the finder frame 71). Further, information 77 about number of photographing sheets that exemplifies "nineteen sheets" is displayed at the right side in the screen. Further, an AF frame 78 which indicates a position to focus and framing guide lines 79 are displayed at the central part of the screen.

Figure 4:
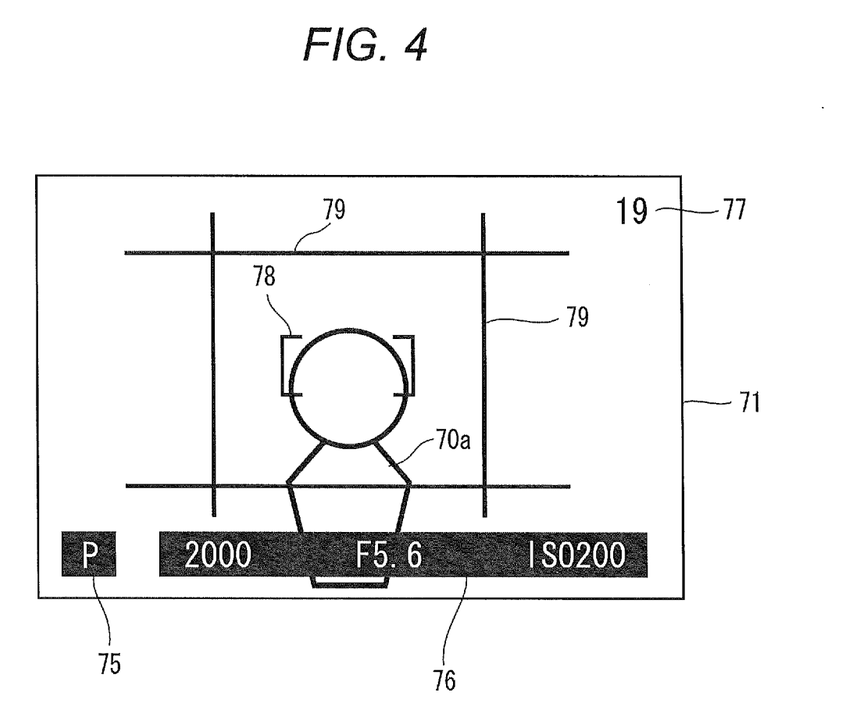

FIG. 4 illustrates an overlap state in which the respective information of FIG. 3A and FIG. 3B overlaps by setting the OVF shutter to be in "open". By doing this, it is possible to display the information by the EVF to be overlapped on a subject image generated by the optical view finder.

Here, it shall be noted that the respective information 75 to 79 illustrated in FIG. 3B are not displayed in "black". The color of "black" cannot be displayed using light information. In practice, the color of "black" is represented by shielding the light A liquid crystal display device represents the color of black by shielding pixel positions to be the color of black from light to prevent light of backlight from being leaked forwardly.

For this reason, when "black" information and light "presence" information of the optical view finder overlap with each other, the "black" information is overwritten with "white" of light presence information so that the information represented in black is cleared. Therefore, displaying information in "black" is stopped, and various information 75 to 79 illustrated in FIG. 3B are displayed in a certain chromatic color.

In the meantime, the EVF information displayed on the EVF display device 61 is not limited to the above-described condition information, and for example, may be the through image information output from the solid state imaging device 21 and may also be an image that displays the subject image photographed immediately after photographing as the preview image.

Figure 5:
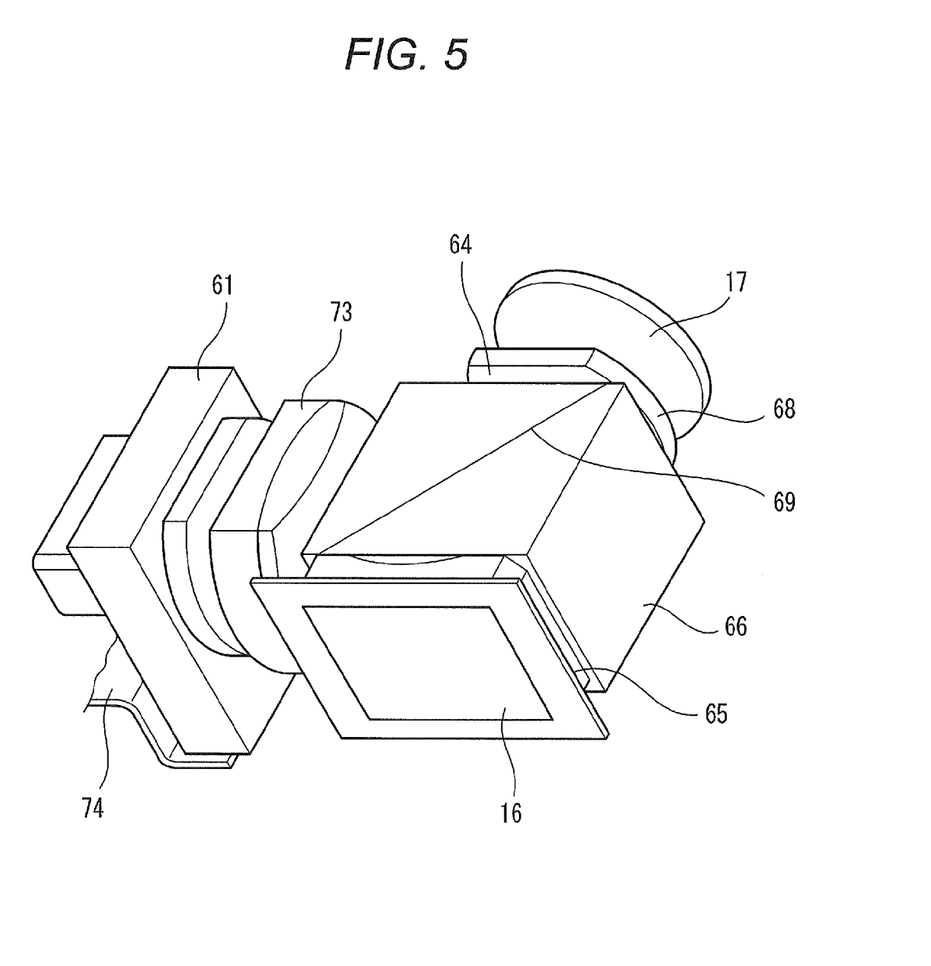
FIG. 5 is a perspective view of an external appearance of a hybrid finder device.

FIG. 5 is a perspective view of an external appearance of the finder device 15. The prism 66 is installed between the subject side finder window 16 and the photographer side observation window 17, and the polarization beam splitter 69 obliquely inclined at 45 degrees with respect to an incident optical axis L is formed in the prism 66.

Figures 6A, 6B:
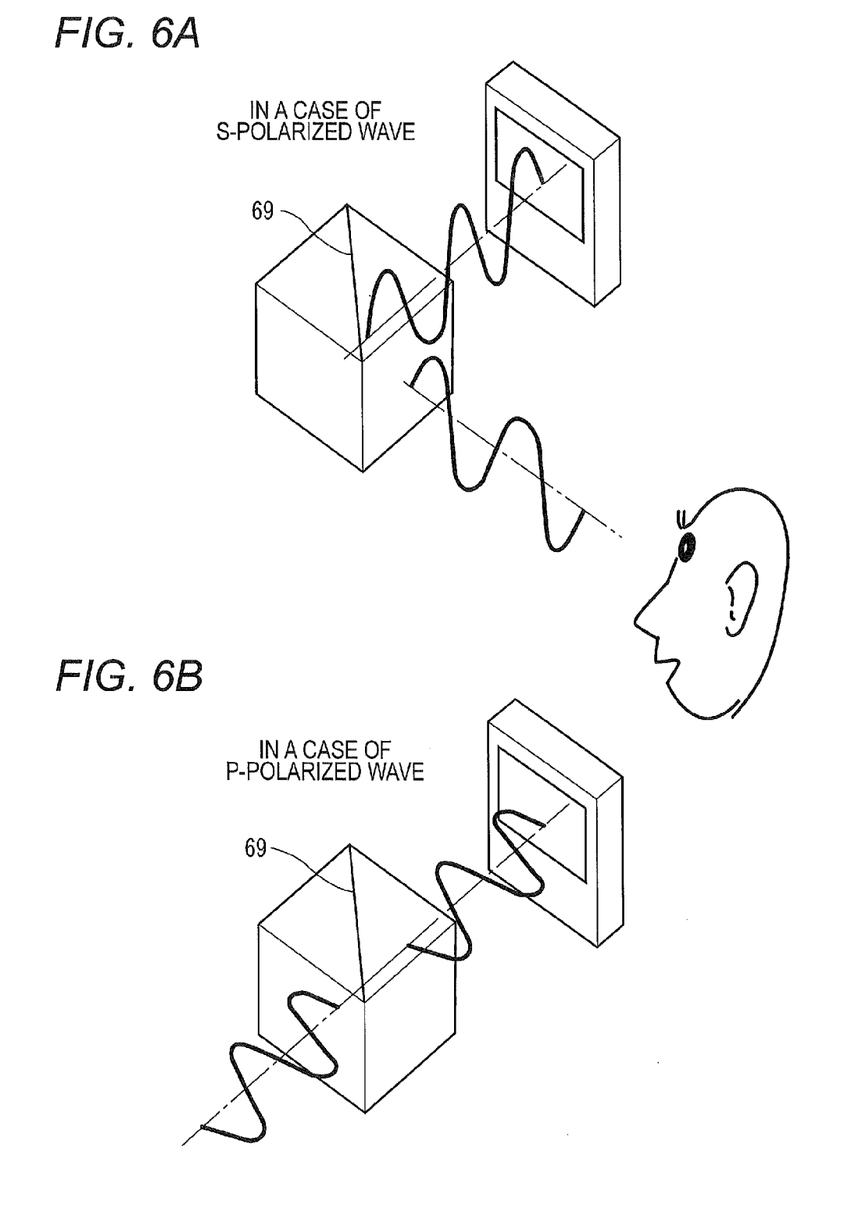
FIGS. 6A and 6B are explanatory views of principle of a polarization beam splitter used in the hybrid finder device.

The polarization beam splitter 69 is configured by a dichroic mirror in the present embodiment, and has property that reflects s-polarized wave of which component of the electric field is perpendicular to the incident plane as illustrated in FIG. 6A and transmits the p-polarized wave of which component of the electric field is parallel to the incident plane as illustrated in FIG. 6B. A commercially available product may be used for the prism 66 having the dichroic mirror.

The objective lens 65 and the OVF shutter of FIG. 2, which is not illustrated in FIG. 5, are installed between the prism 66 and the finder window 16. A polarizing filter (see FIG. 7) 65a which reflects or cuts the s-polarized wave is installed at the surface side of the objective lens 65 disposed at light incident side of the polarization beam splitter 69. The polarizing filter 65a may be not only separately prepared in addition to the lens 65 but also integrally formed with the objective lens 65 by forming a thin film forming the polarizing filter on the surface of the objective lens 65.

The ocular lens 64 and a protection glass 68 are installed between the prism 66 and the photographer side observation window 17, and the liquid crystal display device 61 for EVF is disposed parallel to the prism 66. The lens 73 is installed also between and the liquid crystal display device 61 for EVF and the prism 66, and the liquid crystal display device 61 and the video encoder 41 of FIG. 2 are connected to the FPC 74.

Figure 7:
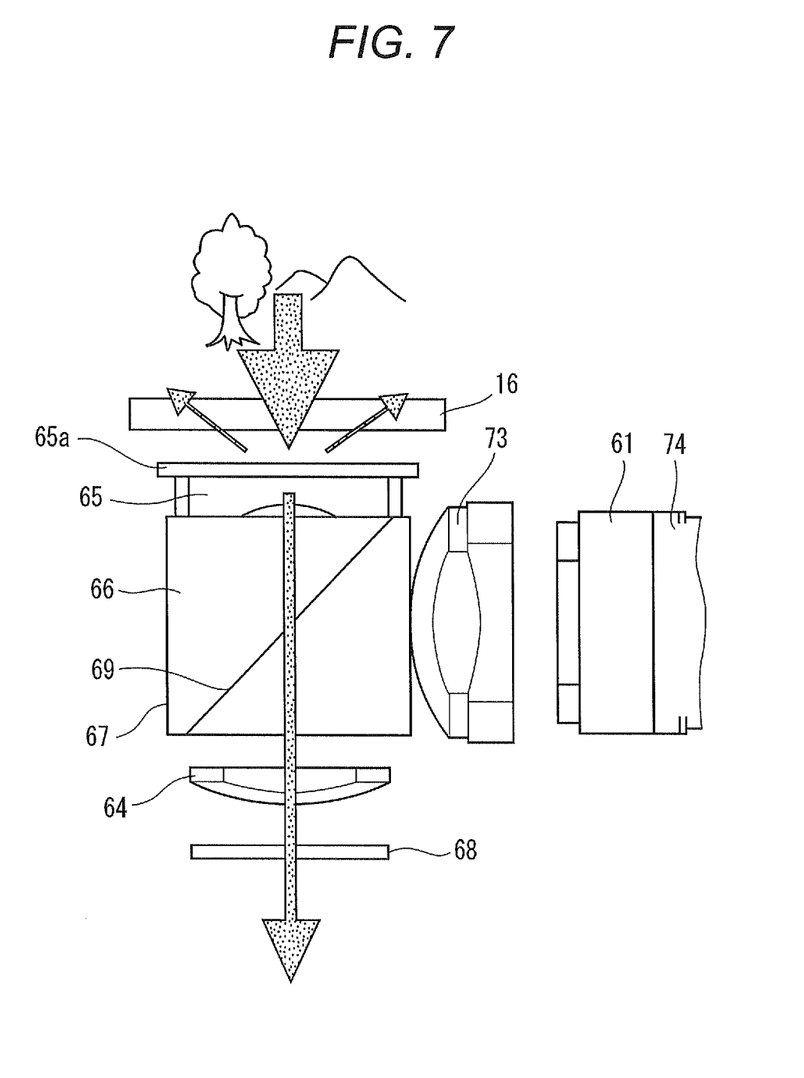
FIG. 7 is an explanatory view of operations of the optical viewfinder part of the hybrid finder device according to an embodiment.

FIG. 7 is an explanatory view for a case where the finder device 15 is used as the optical viewfinder. When the OVF shutter 62 (not illustrated in FIG. 7) described with reference to FIG. 2 becomes to an "open" state and the EVF liquid crystal display device 61 is in a non-display state, the incident light from the subject is entered through the finder window 16 of the finder device 15.

The s-polarized wave of the incident light is cut at the polarizing filter 65 and only the p-polarized wave is incident onto the prism 66. Almost 100% of the p-polarized wave transmits the polarization beam splitter 69 and goes straight, and is entered onto the eyes of the photographer.

Almost 100% of the p-polarized wave transmits the polarization beam splitter 69, but a small amount of light is reflected from the polarization beam splitter 69 and travels toward the end surface 67. However, the small amount of light is absorbed by the carbon film applied to the end surface 67, so that there is little concern that the small amount of light becomes the harmful light.

Figure 8:
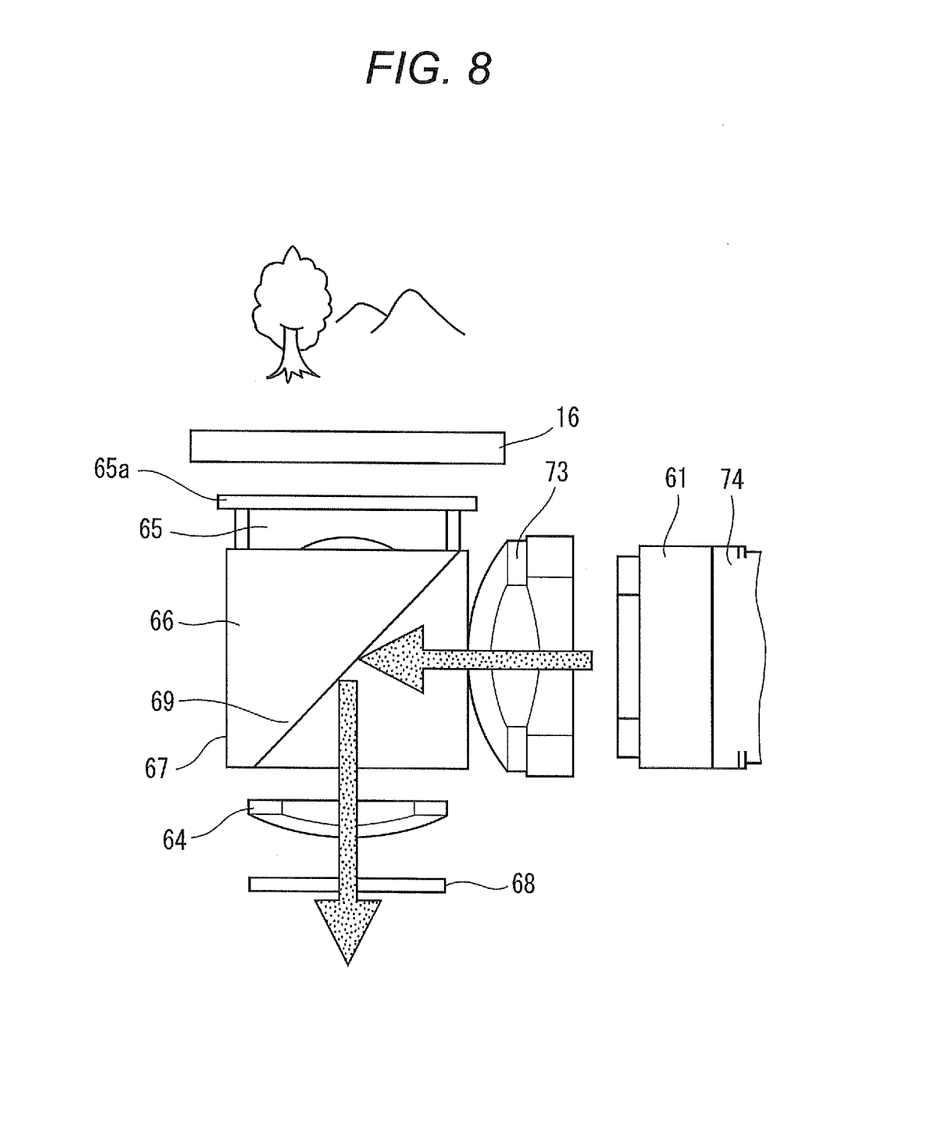
FIG. 8 is an explanatory view of operations of the electronic viewfinder part of the hybrid finder device according to an embodiment.

When the OVF shutter 62 is made to be in "closed" and the image information or the photographing condition information is displayed on the liquid crystal display device 61 for EVF, light rays of the displayed image is exited from the liquid crystal display device 61 as illustrated in FIG. 8. Since the polarizing plate is bonded to the screen of the liquid crystal display device 61, the light rays exited from the screen become a linearly polarized light. The types of the linearly polarized light are s-polarized wave and p-polarized wave, and the liquid crystal display device from which s-polarized wave is exited is selected to be used as the liquid crystal display device 61.

The s-polarized wave from the display device 61 for EVF that was entered into the prism 66 is almost 100% reflected off at the polarization beam splitter 69 to be projected toward the eyes of the photographer. Accordingly, the photographer becomes able to see the EVF information.

Almost 100% of the s-polarized wave is reflected by the polarization beam splitter 69, but an extremely small amount of light transmits the polarization beam splitter 69 and travels toward the end surface 69. However, the small amount of light is absorbed by the carbon film applied to the end surface 67, so that there is little concern that the small amount of light becomes the harmful light.

In the meantime, although the polarizing filter 65a which cuts s-polarized wave is installed at a light entering (incident) side (plane side) of the object lens 65 in the above-described embodiments, the polarizing filter 65a may be installed at a light incident side of the prism 66. However, the polarizing filter 65a is preferably installed at a light incident side of the finder window 16. This is because the s-polarized wave reflected from a light incident surface is exited to outside of the camera and thus there is no concern that it becomes stray light to be a harmful light. The polarizing filter may be a separate member or integrally formed with the finder window 16 by being coated thereto. Forming the polarizing filter by coating reduces the number of the components, it is possible to achieve reduction of manufacturing cost.

Further, although it was described that the liquid crystal display device from which s-polarized wave is exited is selected as the liquid crystal display device 61 for the EVF in the above-described embodiments, there may be a case where only the liquid crystal display device from which p-polarized wave is exited can be prepared. In such a case, the p-polarized wave may be transformed into s-polarized wave by installing a phase plate which changes an angle of the polarized light by 90 degrees in an optical path to the prism 66 at light exiting side of the liquid crystal display device 61 of FIG. 8.

Further, an example in which the OVF shutter 62 is equipped was described in the above-described embodiments. However, for a configuration where the display information of the EVF is always displayed to be overlapped on the optical image of the subject by the OVF, the OVF shutter 62 is not necessarily required.

Furthermore, in the above-described embodiments, a liquid crystal display device is used as the display device 61 for the EVF and a polarizing plate is attached on its screen. For this reason, light rays exited from the display device 61 for the EVF are either s-polarized wave or p-polarized wave. However, other display devices, for example, an organic EL panel may be used as the display device 61 for the EVF. In such a case, when it is used by being combined with a polarizing plate from which light rays being exited become s-polarized wave, it can be applied to the above-described embodiment as it is.

A finder device of the embodiment(s) discussed above, include: a polarization beam splitter disposed between a subject side finder window and a photographer side finder observation window, and disposed to be obliquely inclined at 45 degrees with respect to an optical axis of an incident light entering from the subject side finder window; a polarizing filter installed at an incident light entering side of the polarization beam splitter and configured to reflect or cut s-polarized wave of the incident light; and a display device configured to project a display information of the s-polarized wave on the polarization beam splitter and project the display information reflected from the polarization beam splitter in a direction of the photographer side finder observation window.

And, in the finder device of the embodiment(s), the display device includes a liquid crystal display device which exits an s-polarized wave from a polarizing plate attached to a screen thereof.

And, in the finder device of the embodiment(s), the display device includes a liquid crystal display device which exits p-polarized wave from a polarizing plate attached to a screen thereof, and a phase plate is interposed between the liquid crystal display device and the polarization beam splitter which changes an angle of the polarized light by 90 degrees.

And, in the finder device of the embodiment(s), the polarizing filter is installed on a surface side of an objective lens disposed in the incident light entering side of the polarization beam splitter.

And, in the finder device of the embodiment(s), the polarizing filter is formed on the surface side of the objective lens by being coated thereto.

And, in the finder device of the embodiment(s), the polarizing filter is installed at the light incident surface side of the subject side finder window.

And, in the finder device of the embodiment(s), the polarizing filter is formed on the light incident surface of the subject side finder window by being coated thereto.

And, in the finder device of the embodiment(s), the polarization beam splitter is formed of a dichroic mirror.

And, in the finder device of the embodiment(s), a shutter which transmits or blocks the incident light is installed at the incident light entering side of the polarization beam splitter.

An imaging apparatus of the embodiment(s) is equipped with a solid state imaging device capturing image of a subject and the finder device discussed above.

According to the embodiments as described above, since the hybrid finder device is configured by using the polarization beam splitter which reflects almost 100% of the s-polarized waves and transmits almost 100% of the p-polarized waves, the s-polarized waves transmitting through the polarization beam splitter or the p-polarized waves reflecting from the polarization beam splitter become small to reduce the harmful light so that it becomes possible to provide a user who see through the finder with an easily viewable OVF optical image and an EVF image.

INDUSTRIAL APPLICABILITY

According to finder device of the present invention, the amount of the harmful light becomes very small such that the optical image or image viewed through the finder can be clearly viewed. Therefore, it is possible to provide an easily viewable hybrid finder device and the finder device is useful when applying to the digital camera.

Although the present invention is described with reference to the detailed and specific embodiments, it is apparent to those skilled in the art that various changes or modifications may be applied without departing from the spirit and scope of the present invention.

The present application is based on Japanese Patent Application (Patent Application No. 2010-210227) filed on Sep. 17, 2010, the disclosure of which is incorporated herein by reference in its entirety.

REFERENCE SIGNS LIST

10: digital camera, 11: case, 13: photographing lens
15: hybrid finder device, 16; subject side finder window
17: photographer side observation window
21: solid state imaging device, 32: CPU
33: image signal processing circuit
61: liquid crystal display device for EVF, 62: OVF shutter
65: objective lens, 65*a*: polarizing filter (s-polarized wave cut filter)
66: prism, 67: end surface (carbon film is coated)
69: polarization beam splitter, 75 to 79: various information for EVF

The invention claimed is:

1. A finder device, comprising:
   a polarization beam splitter disposed between a subject side finder window and a photographer side finder observation window, and disposed to be obliquely inclined at 45 degrees with respect to an optical axis of an incident light entering from the subject side finder window;
   a polarizing filter installed at an incident light entering side of the polarization beam splitter and configured to reflect or cut s-polarized wave of the incident light; and
   a display device configured to project a display information of the s-polarized wave on the polarization beam splitter and project the display information reflected from the polarization beam splitter in a direction of the photographer side finder observation window.

2. The finder device of claim 1,
   wherein the display device includes a liquid crystal display device which exits an s-polarized wave from a polarizing plate attached to a screen thereof.

3. The finder device of claim 1,
   wherein the display device includes a liquid crystal display device which exits p-polarized wave from a polarizing plate attached to a screen thereof, and
   a phase plate is interposed between the liquid crystal display device and the polarization beam splitter which changes an angle of the polarized light by 90 degrees.

4. The finder device of claim 1,
   wherein the polarizing filter is installed on a surface side of an objective lens disposed in the incident light entering side of the polarization beam splitter.

5. The finder device of claim 4,
   wherein the polarizing filter is formed on the surface side of the objective lens by being coated thereto.

6. The finder device of claim 1,
   wherein the polarizing filter is installed at the light incident surface side of the subject side finder window.

7. The finder device of claim 6,
   wherein the polarizing filter is formed on the light incident surface of the subject side finder window by being coated thereto.

8. The finder device of claim 1,
   wherein the polarization beam splitter is formed of a dichroic mirror.

9. The finder device of claim 1,
   wherein a shutter which transmits or blocks the incident light is installed at the incident light entering side of the polarization beam splitter.

10. An imaging apparatus equipped with a solid state imaging device capturing image of a subject and the finder device according to claim 1.

* * * * *